(12) United States Patent
Dieterle et al.

(10) Patent No.: US 11,402,289 B2
(45) Date of Patent: *Aug. 2, 2022

(54) MEANS FOR IMPLEMENTING A METHOD FOR DETECTING AND COMPENSATING FOR A RAPID TEMPERATURE CHANGE IN A PRESSURE MEASURING CELL

(71) Applicant: VEGA GRIESHABER KG, Wolfach (DE)

(72) Inventors: Levin Dieterle, Oberwolfach (DE); Bernhard Weller, Wolfach (DE)

(73) Assignee: VEGA GRIESHABER KG, Wolfach (DE)

( * ) Notice: Subject to any disclaimer, the term of this patent is extended or adjusted under 35 U.S.C. 154(b) by 373 days.

This patent is subject to a terminal disclaimer.

(21) Appl. No.: 16/416,530

(22) Filed: May 20, 2019

(65) Prior Publication Data

US 2019/0293509 A1 Sep. 26, 2019

Related U.S. Application Data

(63) Continuation-in-part of application No. 16/358,162, filed on Mar. 19, 2019.

(30) Foreign Application Priority Data

Mar. 20, 2018 (DE) .................... 10 2018 106 563.9

(51) Int. Cl.
*G01L 9/12* (2006.01)
*G01F 23/18* (2006.01)
*G01L 9/00* (2006.01)

(52) U.S. Cl.
CPC .............. *G01L 9/125* (2013.01); *G01F 23/18* (2013.01); *G01L 9/0075* (2013.01)

(58) Field of Classification Search
CPC ..... G01L 9/125; G01L 27/002; G01L 9/0075; G01L 19/04; G01L 9/0005; G01F 23/18
(Continued)

(56) References Cited

U.S. PATENT DOCUMENTS 8,099,249 B2 * 1/2012 Jacob ...................... G01L 9/125
702/50
2011/0100130 A1 * 5/2011 Gruhler ................. G01L 9/0075
73/708

(Continued)

FOREIGN PATENT DOCUMENTS

CN 101738287 A 6/2010
EP 1 186 875 B1 7/2001
(Continued)

OTHER PUBLICATIONS

Office Action for related German application 10 2018 106 563.9, issued by German Patent Office dated Feb 6, 2019.
(Continued)

*Primary Examiner* — Marrit Eyassu
(74) *Attorney, Agent, or Firm* — William Gray Mitchell

(57) ABSTRACT

The invention relates to various means for implementing a method for compensating measured values in capacitive pressure measuring cells using a measuring capacity and at least one reference capacity, comprising the following steps:

determination of a pressure-induced capacitance change of the reference capacitance as a function of a pressure-induced capacitance change of the measuring capacitance, (Continued)

determination of a thermal shock-induced capacitance change of the reference capacitance as a function of a thermal shock-induced capacitance change of the measuring capacitance, measurement of the measuring capacitance and of the at least one reference capacitance, determination of the thermal shock-induced capacitance change of the measuring capacitance from a combination of the above dependencies, compensation of the measured measuring capacitance by the thermal shock induced capacitance change of the measuring capacitance, and determination and output of the pressure-induced capacitance change or a quantity derived therefrom.

4 Claims, 3 Drawing Sheets

(58) Field of Classification Search
USPC .......................................................... 73/708
See application file for complete search history.

(56) References Cited

U.S. PATENT DOCUMENTS

| | | | | |
|---|---|---|---|---|
| 2011/0160560 | A1* | 6/2011 | Stone | G01L 9/125 600/398 |
| 2014/0144206 | A1* | 5/2014 | Uehlin | G01L 9/0072 73/1.15 |
| 2015/0346044 | A1* | 12/2015 | Mullis | G01L 9/125 73/724 |
| 2016/0320256 | A1* | 11/2016 | Burgard | G01L 9/12 |

FOREIGN PATENT DOCUMENTS

| | | |
|---|---|---|
| EP | 2 189 774 A1 | 5/2010 |
| EP | 3 124 937 A1 | 2/2017 |

OTHER PUBLICATIONS

Office Action for related Chinese application 201902112451, issued by CIPO dated Dec. 13, 2021.

* cited by examiner

MEANS FOR IMPLEMENTING A METHOD FOR DETECTING AND COMPENSATING FOR A RAPID TEMPERATURE CHANGE IN A PRESSURE MEASURING CELL

CROSS REFERENCE TO RELATED APPLICATIONS

This patent application claims priority to German Patent Application 10 2018 106 563.9, filed on Mar. 20, 2018 and U.S. patent application Ser. No. 16/358,162, filed Mar. 19, 2019.

STATEMENT REGARDING FEDERALLY SPONSORED RESEARCH OR DEVELOPMENT

No federal government funds were used in researching or developing this invention.

NAMES OF PARTIES TO A JOINT RESEARCH AGREEMENT

Not applicable.

SEQUENCE LISTING INCLUDED AND INCORPORATED BY REFERENCE HEREIN

Not applicable.

BACKGROUND

Field of the Invention

The present invention relates to various means for implementing a method for detecting and compensating for a rapid temperature change in a pressure measuring cell.

Background of the Invention

A pressure measuring cell, is known from EP 1 186 875 B1, for example. Such a pressure measuring cell usually consists of a base body and a measuring membrane, wherein a membrane deformable by a pressure to be measured is arranged on the base body via a circumferential joint. Circular electrodes are preferably provided on one side of the base body facing the membrane and on the side of the membrane facing the base body, which together form a measuring capacitor the measuring signal of which is evaluated. In order to compensate for interference effects such as temperature or drift, a reference capacitor is arranged in a circle around the measuring capacitor.

At that point, it should be noted that the two capacitors formed are referred to in the following as the measuring capacitor and reference capacitor. Both the measuring capacitor and the reference capacitor change their capacitance during deflection, e.g. by pressurizing the membrane due to change in distance between the electrodes. However, as this change is less on the reference capacitor than on the measuring capacitor due to arrangement thereof at an edge of the membrane adjacent to the joint, and as it is known in which relation the measuring capacitor and reference capacitor are changed by pressure, external influences may be compensated.

If such a pressure measuring cell is in thermal equilibrium with the surrounding environment thereof, temperature dependence of the pressure measurement can be compensated by means of a temperature sensor arranged on the back of the base body. A rapid change in temperature, for example a so-called thermal shock, may result in distortions in the membrane of the pressure measuring cell, which will entail incorrectly measured values due to a deflection of the measuring membrane caused by this. The stresses on the membrane result from a temperature difference between a medium acting on the membrane of the pressure measuring cell and the base body of the pressure measuring cell, which is remote from the medium and is in thermal communication with the environment and supports the membrane.

According to the above-mentioned EP 1 186 875 B1, this problem is solved by placing a second temperature sensor in the direction of an expected temperature gradient, i.e. in a connecting layer between the membrane and the body supporting this membrane. Thus, temperature changes with steep temperature gradients may swiftly be detected, so that temperature shocks can be distinguished from actual change in pressures and can be compensated.

A disadvantage of this known solution resides in that a temperature change due to a thickness of the membrane can only be detected by the additional temperature sensor with a delay of time. However, since changes in the measuring signal due to thermal shock occur very fast, error compensation by means of the two temperature sensors is very insufficient, especially for small measuring ranges, as the thin membrane used therein almost immediately absorbs the change in temperature.

Furthermore, manufacture of such a pressure measuring cell according to EP 1 186 875 B1 is very complex and therefore also expensive, as installation of a temperature sensor in the joining area between the membrane and the base body of the pressure measuring cell as well as contacting and signal evaluation thereof is associated with additional effort. There must also be sufficient space for installation of an additional temperature sensor at a suitable location. With increase of miniaturization of the underlying pressure measuring cells, this no longer is an easily performed.

In EP 3 124 937 A1, a procedure is disclosed as a further development, wherein a measuring signal of the pressure measuring cell is corrected and/or directly smoothed or is smoothed depending on the magnitude of the temperature difference, depending on a change in the temperature difference over time. This procedure aims to avoid complex compensation algorithms at the beginning of a thermal shock, as a very high dynamic range in the measured value change is then to be expected. It is therefore provided to freeze a measured value output before onset of a large change in the temperature difference between the two temperature sensors, i.e. in the sense of a sample-and-hold member to continue outputting the measured value previously recorded for the phase of high dynamics.

In order to implement the procedure proposed in EP 3 124 937 A1, a pressure measuring cell comprising two temperature sensors is equally required, and thus, there are the same disadvantages as described for EP 1 186 875 B1.

It is the object of the present invention to further develop a pressure measuring cell and a method for operating such a pressure measuring cell such that they overcome the disadvantages of the state of the art.

This object will be solved by a procedure having the features of patent claim 1. Advantageous further embodiments is the object of the dependent patent claims.

BRIEF SUMMARY OF THE INVENTION

In a preferred embodiment, method for compensating measured values in capacitive pressure measuring cells (100) using a measuring capacitance and at least one reference capacitance, comprising the following steps:
- determination of a pressure-induced capacitance change of the reference capacitance ($C_{r,p}$) as a function of a pressure-induced capacitance change of the measuring capacitance ($C_{m,p}$),
- determination of a thermal shock-induced capacitance change of the reference capacitance ($C_{r,TS}$) as a function of a thermal shock-induced capacitance change of the measuring capacitance ($C_{m,TS}$),
- measurement of the measuring capacitance ($C_{m,meas}$) and the at least one reference capacitance ($C_{r,meas}$),
- determination of the thermal shock-induced capacitance change of the measuring capacitance ($C_{m,TS}$) from a combination of the above dependencies,
- compensation of the measured measuring capacitance ($C_{m,meas}$) using the thermal shock-induced capacitance change of the measuring capacitance ($C_{m,TS}$), and
- determination and output of the pressure-induced capacitance change ($C_{m,p}$) or a quantity derived therefrom.

In another embodiment, the method as described herein, comprising the following additional steps:
- determination of a static temperature-induced capacitance change of the measuring capacitance ($C_{m,T}$) as a function of a reference temperature ($T_{ref}$) and the system temperature (T)
- determination of a static temperature-induced capacitance change of the at least one reference capacitance ($C_{r,T}$) as a function of a reference temperature ($T_{ref}$) and the system temperature (T)
- Measurement of the system temperature (T),
- determination of temperature-induced change of measuring capacity ($C_{m,T}$),
- compensation of the measurement capacitance ($C_{m,meas}$) by the thermal shock induced capacitance change of the measurement capacitance ($C_{m,TS}$) and the temperature-induced change of the measurement capacitance ($C_{m,T}$), and
- determination and output of the pressure-induced capacitance change of the measuring capacitance ($C_{m,T}$) or a quantity derived therefrom.

In another embodiment, the method as described herein, characterized in that the determination of the pressure-induced capacitance change of the reference capacitance ($C_{r,p}$) as a function of the pressure-induced capacitance change of the measuring capacitance ($C_{m,p}$) comprises the measurement of the dependence preferably for each pressure measuring cell (100) for a plurality of at least three measuring points and a first interpolation on the basis of these measuring points.

In another embodiment, the method as described herein, characterized in that the first interpolation of the pressure-induced capacitance change of the reference capacitance ($C_{r,p}$) is performed as a function of a pressure-induced capacitance change of the measuring capacitance ($C_{m,p}$) with a first polynomial of at least a second degree.

In another embodiment, the method as described herein, characterized in that the determination of the static temperature-induced capacitance change of the measuring capacitance ($C_{m,T}$) as a function of a reference temperature ($T_{ref}$) and the system temperature (T) comprises measurement of the measuring capacitance ($C_{m,meas}$) as a function of the system temperature (T), preferably for each pressure measuring cell (100) for at least two measuring points, and a second interpolation based on these measuring points.

In another embodiment, the method as described herein, characterized in that the second interpolation is performed with a second polynomial of at least second-degree.

In another embodiment, the method as described herein, characterized in that determination of the static temperature-induced capacitance change of the reference capacitance ($C_{r,T}$) as a function of the reference temperature ($T_{ref}$) and the system temperature (T) comprises measurement of the measuring capacitance as a function ($C_{m,meas}$) of the system temperature (T) preferably for each measuring cell for at least two measuring points and a third interpolation based on these measuring points.

In another embodiment, the method as described herein, characterized in that the third interpolation is performed using a third polynomial of at least second-degree.

In another embodiment, the method as described herein, characterized in that determination of the thermal shock-induced capacitance change of the reference capacitance ($C_{r,TS}$) as a function of the thermal shock-induced capacitance change of the measuring capacitance ($C_{m,TS}$) comprises measurement of this dependence for a plurality of pressure measuring cells (100) of a production batch for at least three respective measuring points and a fourth interpolation based on these measuring points.

In another embodiment, the method as described herein, characterized in that the fourth interpolation is performed with a fourth polynomial of at least first-degree.

In another embodiment, the method as described herein, characterized in that thick membranes (102) having a thickness greater than 0.25 mm are interpolated with a first-degree polynomial and thin membranes (102) having a thickness of 0.25 mm or less are interpolated with a third-degree polynomial.

In another embodiment, a computer program for compensating measured values in capacitive pressure measuring cells using a measuring capacitance and at least one reference capacitance, and a memory a pressure-induced capacitance change of the reference capacitance as a function of a pressure-induced capacitance change of the measuring capacitance, and a thermal shock-induced capacitance change of the reference capacitance as a function of a thermal shock-induced capacitance change of the measuring capacitance, being stored in the memory the computer program when being executed instructing a microcontroller implementing the following steps: measurement of the measuring capacitance and the at least one reference capacitance, determination of the thermal shock-induced capacitance change of the measuring capacitance from a combination of the above dependencies, compensation of the measured measuring capacitance using the thermal shock-induced capacitance change of the measuring capacitance, and determination and output of the pressure-induced capacitance change or a quantity derived therefrom.

In another preferred embodiment, a computer readable media comprising program code when being executed making a measurement electronic with a microcontroller implementing a method for compensating measured values in capacitive pressure measuring cells using a measuring capacitance and at least one reference capacitance, comprising the following steps: determination of a pressure-induced capacitance change of the reference capacitance as a function of a pressure-induced capacitance change of the measuring capacitance, determination of a thermal shock-induced capacitance change of the reference capacitance as a function of a thermal shock-induced capacitance change of the measuring capacitance, measurement of the measuring capacitance and the at least one reference capacitance, determination of the thermal shock-induced capacitance change of the measuring capacitance from a combination of the above dependencies, compensation of the measured measuring capacitance using the thermal shock-induced capacitance change of the measuring capacitance, and determination and output of the pressure-induced capacitance change or a quantity derived therefrom.

In another preferred embodiment, a fill level measurement arrangement a pressure measuring cell comprising a membrane being attached to a base body via a circumferential joint, a membrane electrode being arranged on the membrane, a measuring electrode and a reference electrode surrounding the measuring electrode being arranged opposite to the membrane electrode on the base body, the membrane electrode and the measuring electrode forming a measuring capacitance and the membrane electrode and the reference electrode forming a reference electrode, a measuring electronic coupled to the pressure measuring cell and comprising a microcontroller implementing a method for compensating measured values in capacitive pressure measuring cells using a measuring capacitance and at least one reference capacitance, comprising the following steps: determination of a pressure-induced capacitance change of the reference capacitance as a function of a pressure-induced capacitance change of the measuring capacitance, determination of a thermal shock-induced capacitance change of the reference capacitance as a function of a thermal shock-induced capacitance change of the measuring capacitance, measurement of the measuring capacitance and the at least one reference capacitance, determination of the thermal shock-induced capacitance change of the measuring capacitance from a combination of the above dependencies, compensation of the measured measuring capacitance using the thermal shock-induced capacitance change of the measuring capacitance, and determination and output of the pressure-induced capacitance change or a quantity derived therefrom.

In another preferred embodiment, compensation device for compensating measured values of a capacitive pressure measuring cells using a measuring capacitance and at least one reference capacitance, and a memory, a pressure-induced capacitance change of the reference capacitance as a function of a pressure-induced capacitance change of the measuring capacitance, and a thermal shock-induced capacitance change of the reference capacitance as a function of a thermal shock-induced capacitance change of the measuring capacitance, being stored in the memory, the compensation device further comprising microcontroller coupled to the capacitive measuring cell and the memory the microcontroller implementing the following steps: measurement of the measuring capacitance and the at least one reference capacitance, determination of the thermal shock-induced capacitance change of the measuring capacitance from a combination of the above dependencies, compensation of the measured measuring capacitance using the thermal shock-induced capacitance change of the measuring capacitance, and determination and output of the pressure-induced capacitance change or a quantity derived therefrom.

DETAILED DESCRIPTION OF THE INVENTION

Figure 1:
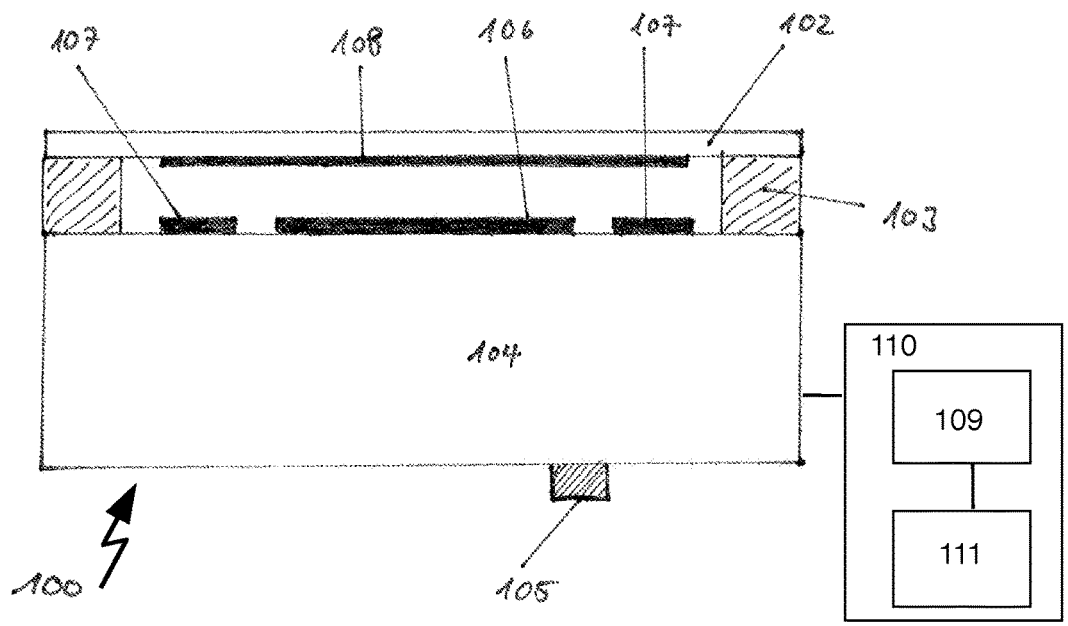
FIG. 1 is a line drawing showing a pressure measuring cell in which the procedure of the present application can be used.

The invention is a method for the compensation of measured value in capacitive pressure measuring cells having a measuring capacitance and at least one reference capacitance, a pressure-induced change in capacitance of the at least one reference capacitance is first determined as a function of a pressure-induced change in capacitance of the measuring capacitance. In addition, a thermal shock-induced change in capacitance of the at least one reference capacitance is determined as a function of a thermal shock-induced change in capacitance of the measuring capacitance. The measurement capacitance and the at least one reference capacitance are measured and the thermal shock-induced change in capacitance of the measurement capacitance will be determined from a combination of the measured dependencies. The measuring capacitance is compensated by the thermal shock-induced change in capacitance of the measuring capacitance and the pressure-induced change in capacitance or a quantity derived therefrom is determined and output.

Preferably, the pressure measuring cell has a single reference capacitance which is preferably arranged in a ring around the measuring capacitance.

It is known that with capacitive pressure measuring cells of the underlying type, the reference capacitance and the measuring change in capacitance with a specific interdependence under the effect of pressure. Measurements have shown that this dependence of the pressure-induced change in capacitance of the reference capacitance on the pressure-induced change in capacitance of the measuring capacitance can be described with sufficient accuracy when using a quadratic function.

Determination of the pressure-induced change in capacitance of the reference capacitance as a function of the pressure-induced change in capacitance of the measuring capacitance can be carried out, for example, by measuring that dependence at a given number of at least 3 measuring points during calibration of the pressure measuring cell following manufacture thereof, and the dependence can be interpolated based on these measuring points for the measuring range of the pressure measuring cell. For example, a polynomial interpolation with the three measuring points can be performed as grid points for a second degree polynomial.

Determination of the thermal shock-induced change in capacitance of the reference capacitance as a function of the thermal shock-induced change in capacitance of the measuring capacitance is also carried out in advance. For example, the pressure measuring cell can be exposed to various thermal shocks, from which shocks change in reference capacitance is also determined as a function of the measuring capacitance. From a plurality of measuring points an interpolation, and thus a polynomial interpolation may again occur herein, thus determining the dependence as a polynomial.

In order to achieve a reliable determination of this dependence, it is advantageous for the pressure measuring cell to be exposed to at least one positive thermal shock, i.e. a rapid temperature rise, and one negative thermal shock, i.e. a rapid temperature drop, at constant pressure conditions. This can be done, for example, by pouring a hot liquid at a defined temperature over the pressure measuring cell, e.g. boiling water, or by pouring a cold liquid at a defined temperature over the pressure measuring cell, e.g. a refrigerant at −40° C., each time starting from a measuring cell heated to 20° C.

Tests have shown that the thermal shock-induced change in capacitance of the reference capacitance can be described with sufficient accuracy dependent on the thermal shock-induced change in capacitance of the measuring capacitance as a function of the measuring range of the pressure measuring cell using a linear function or a cubic function. Depending on the type of measuring cell, it may also be necessary to describe this dependence for positive thermal shocks and for negative thermal shocks each time using a dedicated function.

On the whole, it has been shown that for pressure measuring cells having a large measuring range, i.e. a thick measuring membrane, linear functions are sufficient to describe the dependence and that for pressure measuring cells having a small measuring range, i.e. a thin measuring membrane, it is necessary to select a cubic function to describe the dependence.

In this specification, a pressure measuring cell having a large measuring range is to be understood as a pressure measuring cell for measuring pressures of up to several tens of bar, in particular about 60 bar. The underlying design of the pressure measuring cells comprises a membrane having a thickness of about one millimeter. The measuring cells of the applicant are of a diameter of 18 mm and 28 mm. Especially for the smaller measuring cell, it is difficult to integrate an additional temperature sensor due to additional space required on the membrane.

In the present specification, a pressure measuring cell having a small measuring range is to be understood as a pressure measuring cell for measuring pressures up to a maximum of several tens of a bar, in particular up to about 0.1 bar. The underlying design of the pressure measuring cells comprises a membrane having a thickness of about one tenth of a millimeter.

When operating the pressure measuring cell, the measuring capacitance and the reference capacitance are measured. Based on the dependencies previously determined, the thermal shock-induced change in capacitance of the measurement capacitance may be determined so that the measurement capacitance can be compensated by the thermal shock-induced change in capacitance of the measurement capacitance and the pressure-induced change in capacitance or a quantity derived therefrom may be determined and output.

With this method, it is possible not only to detect thermal shocks as in state-of-the-art technology, but also to compensate for them.

In a another embodiment of the present procedure—again preferably when calibrating the pressure measuring cell—a static temperature-induced change in capacitance of the measuring capacitance as a function of a reference temperature and the system temperature and a static temperature-induced change in capacitance of the reference capacitance as a function of a reference temperature and the system temperature are determined. If a system temperature of the pressure measuring cell is then measured while the pressure measuring cell is being operated, a temperature-induced change of the measuring capacitance may be determined and the measuring capacitance may be compensated by the thermal shock-induced change of the measuring capacitance and by the temperature-induced change of the measuring capacitance. The pressure-induced change in capacitance of the measuring capacitance or a quantity derived therefrom can thus be determined with even greater accuracy.

By determining the static temperature-induced change in capacitance of the reference capacitance and the measurement capacitance as a function of a reference temperature and the system temperature, the thermal shock-induced change in capacitance of the measurement capacitance can also be determined even more precisely, so that overall a measurement with higher accuracy is possible.

In this application, the system temperature is to be understood as the temperature of the measuring cell if it is in thermal equilibrium, i.e. the measuring cell is completely heated, i.e. a temperature gradient no longer exists within the pressure measuring cell. In practice, the system temperature is measured by means of a sensor on a side of the base body of the pressure measuring cell facing away from the membrane. It is assumed that temperature effects are caused by the medium to be measured and that temperature throughout the pressure measuring cell is equal to the temperature measured at that point.

To determine the system temperature, the pressure measuring cell only has a single temperature sensor, which is arranged on the side of the base body of the pressure measuring cell facing away from the membrane or on an electronic circuit board located therein.

The reference temperature assumed is a specified temperature at which the pressure measuring cell is essentially without thermally induced stresses. For example, a temperature of 20° C. may be assumed as the reference temperature. The thermally induced change in capacitance of the measurement capacitance and the reference capacitance will then be indicated in relation to the capacitance at the reference temperature.

Measurements have shown that the dependence of the measuring capacitance on the system temperature can be represented with sufficient accuracy by a quadratic function. If the change in capacitance of the measuring capacitance dependent on the system temperature is determined for at least three measuring points, the underlying function may be determined by polynomial interpolation using the three measuring points as interpolation points.

Determination of the pressure-induced change in capacitance of the reference capacitance as a function of the pressure-induced change in capacitance of the measuring capacitance may preferably comprise measurement of this dependence preferably for each measuring cell for a plurality of at least three measuring points and a first interpolation based on these measuring points. This measurement may be factory-done when calibrating the pressure measuring cell.

The first interpolation of the pressure-induced change in capacitance of the reference capacitance as a function of a pressure-induced change in capacitance of the measuring capacitance may advantageously be performed with a first polynomial, at least of second-degree. As already explained, a second-degree polynomial is usually sufficient to describe the relations precisely enough. If it is determined that higher accuracy is required, a higher order polynomial may also be used.

Determination of the static temperature-induced change in capacitance of the measuring capacitance as a function of a reference temperature and the system temperature preferably comprises measuring the measuring capacitance as a function of the system temperature preferably for each measuring cell at at least three measuring points and a second interpolation based on those measuring points.

The second interpolation is preferably done with a second polynomial of at least second-degree, which is usually sufficient. If higher accuracy is required, a polynomial of higher-order may also be used, wherein for polynomial interpolation a correspondingly larger number of interpolation points is required.

The determination of the static temperature-induced change in capacitance of the reference capacitance as a function of a reference temperature and the system temperature preferably comprises measurement of the measuring capacitance as a function of the system temperature preferably for each measuring cell for at least three measuring points and a third interpolation based on these measuring points.

The third interpolation is performed to achieve sufficient accuracy with a third polynomial of at least second-degree. If higher accuracy is required, a higher-order polynomial may also be used, wherein a correspondingly higher number of sampling points is required for polynomial interpolation.

Static temperature-induced change in capacitance of the measuring capacitance and the reference capacitance may be determined together in one measurement.

Determination of the thermal shock-induced change in capacitance of the reference capacitance as a function of the thermal shock-induced change in capacitance of the measuring capacitance, for example, can include measurement of this dependence for a plurality of pressure measuring cells of a production batch for at least one positive and one negative thermal shock, and a fourth interpolation based on measuring points obtained therefrom.

As the pressure measuring cells of the present invention are used to carry out a capacitance measurement every 2 to 10 ms, a large number of measured values for a large number of temperatures acting in each case may be determined from one positive and one negative thermal shock, so that the above-mentioned measurement generally is sufficient to be able to make reliable indication concerning the underlying dependence It may thus be achieved that detection and compensation of a thermal shock may take place without temperature measurement. The underlying measuring cells thus only require a single temperature sensor to determine the system temperature, which is used to determine the static temperature-related capacitance change.

The fourth interpolation can be performed with at least one fourth polynomial of at least first-degree. Depending on the design and dimension of the underlying measuring cell, it may also be sufficient if only a positive thermal shock is measured. This may simply be determined by appropriate tests and is adapted accordingly by the person skilled in the art.

The dimensions of the measuring cell, which significantly determine the measuring range thereof, also have an effect on whether a first-degree polynomial, i.e. a straight line, or a third-degree polynomial is used for the representation of the existing dependence. In particular for thick membranes having a thickness of more than 0.25 mm, an interpolation with a first-degree polynomial is advantageously performed and for thin membranes having a thickness of 0.2 mm or less an interpolation with a third-degree polynomial is advantageously performed.

Under certain circumstances it may also be useful to use a separate dependence function for positive and negative thermal shocks, each of which is valid from an intersection of the functions.

The present application also relates to a computer program for compensating measured values in capacitive pressure measuring cells using a measuring capacitance and at least one reference capacitance, and a memory, a pressure-induced capacitance change of the reference capacitance as a function of a pressure-induced capacitance change of the measuring capacitance, and a thermal shock-induced capacitance change of the reference capacitance as a function of a thermal shock-induced capacitance change of the measuring capacitance, being stored in the memory. The computer program when being executed instructing a microcontroller implementing the following steps:

measurement of the measuring capacitance and the at least one reference capacitance, determination of the thermal shock-induced capacitance change of the measuring capacitance from a combination of the above dependencies, compensation of the measured measuring capacitance using the thermal shock-induced capacitance change of the measuring capacitance, and determination and output of the pressure-induced capacitance change or a quantity derived therefrom.

A respective computer program when being executed on a microcontroller thus implements the method as disclosed above.

It is another aspect of the present invention to provide for a computer readable media comprising program code when being executed making a measurement electronic with a microcontroller implementing the method as claimed and disclosed in the present application.

Preferably, the measurement electronic is embodied as an electronics board for processing the raw material data provided by the measuring cell, and is thus is electronically connected to the pressure measuring cell. The measurement electronic further comprises the microcontroller, which in a preferred embodiment is a compact integrated circuit chip, preferably including a processor and either comprising or attached to a memory.

Another aspect of the present invention relates to a fill level measurement arrangement a pressure measuring cell comprising a membrane being attached to a base body via a circumferential joint, a membrane electrode being arranged on the membrane, a measuring electrode and a reference electrode surrounding the measuring electrode being arranged opposite to the membrane electrode on the base body, the membrane electrode and the measuring electrode forming a measuring capacitance and the membrane electrode and the reference electrode forming a reference electrode, a measuring electronic coupled to the pressure measuring cell and comprising a microcontroller implementing the method as described above.

A further aspect of the present invention relates to a compensation device for compensating measured values of capacitive pressure measuring cells using a measuring capacitance and at least one reference capacitance, and a memory, a pressure-induced capacitance change of the reference capacitance as a function of a pressure-induced capacitance change of the measuring capacitance, and a thermal shock-induced capacitance change of the reference capacitance as a function of a thermal shock-induced capacitance change of the measuring capacitance, being stored in the memory. The compensation device further comprising microcontroller coupled to the capacitive measuring cell and the memory the microcontroller implementing a method with the following steps:

measurement of the measuring capacitance and the at least one reference capacitance, determination of the thermal shock-induced capacitance change of the measuring capacitance from a combination of the above dependencies, compensation of the measured measuring capacitance using the thermal shock-induced capacitance change of the measuring capacitance, and determination and output of the pressure-induced capacitance change or a quantity derived therefrom.

DETAILED DESCRIPTION OF THE FIGURES

FIG. 1 shows an example of a pressure measuring cell 100 in which the procedure of the present application can be used.

The pressure measuring cell is designed as a ceramic pressure measuring cell 100, wherein a membrane 102, which can be deformed by the pressure of a medium (fluid or gas) acting on the membrane 102, is arranged on the front side of the pressure measuring cell 100. The membrane 102 is attached to a base body 104 of the pressure measuring cell 100, which also consists of a ceramic material, via a circumferential joint 103, which is designed as a glass joint.

A membrane electrode 108 is arranged on the membrane 102 and a measuring electrode 106 and a reference electrode 107 surrounding the measuring electrode 106 are arranged opposite to it on the base 104. In this example, the membrane electrode 108 and the measuring electrode 106 are circular-shaped and the reference electrode 107 is annular-shaped. Due to a change in pressure in the medium acting on the membrane 102, a distance between the membrane electrode 108 and the measuring electrode 106 changes, so that the value of a measuring capacitance $C_{m,meas}$ measured therein changes. The reference capacitance $C_{r,meas}$ formed between the membrane electrode 108 and the reference electrode 107 also changes, but to an extent, in relation to $C_{m,meas}$, that may be determined for each pressure measuring cell 100 and can thus be used to compensate negative influences on the measuring capacitance $C_{m,meas}$ between the membrane electrode 108 and the measuring electrode 106.

The pressure measuring cell 100 also has a temperature sensor 105, which is located on the back of the body 104 or on an electronics board located therein. By means of the temperature sensor 105 a system temperature T of the pressure measuring cell 100 may be determined. As temperature effects are mainly to be expected from the medium side, it can be assumed that in the pressure measuring cell 100 the system temperature T is measured on the back of the basic body.

Also pictured in FIG. 1 is the measurement electronic 110, further comprising the microcontroller 109 and memory 111, which memory is optionally connected to or integrated within the microcontroller. Such measurement electronic is pictured as electrically connected to the pressure measuring cell 100 to allow for communication.

The measured capacitance value $C_{m,meas}$ of the measuring capacitance and the measured capacitance value $C_{r,meas}$ of the reference capacitance of such a ceramic capacitive pressure measuring cell 100 in the simplest case consist of three partial capacitances, wherein a first portion is caused by the applied pressure p (pressure-induced), a second portion is caused by the prevailing system temperature T (temperature-induced) and a third portion is caused by a thermal shock TS (thermal shock-induced). The following descriptions will be used below:

$C_{m,meas}$ capacitance value of the measuring capacitance measured $C_{m,p}$ pressure-induced portion of measuring capacitance $C_{m,T}$ temperature-induced portion of the measuring capacitance $C_{m,TS}$ thermal shock-induced portion of measuring capacitance $C_{r,meas}$ capacitance value of reference capacitance measured $C_{r,p}$ pressure-induced portion of reference capacitance $C_{r,T}$ temperature-induced portion of reference capacitance $C_{r,TS}$ thermal shock-induced portion of reference capacitance The relation described above can thus be illustrated as follows:

$$C_{m,meas} = C_{m,p} + C_{m,TS} + C_{m,T}$$

$$C_{r,meas} = C_{r,p} + C_{r,TS} + C_{r,T}$$

The pressure-induced values required for pressure measurement using the sensor, i.e. the portions of the measured capacities $C_{m,meas}$, $C_{r,mes}$ which are purely pressure-dependent, can thus be calculated as follows:

$$C_{m,p} = C_{m,meas} - C_{m,TS} - C_{m,T}$$

$$C_{r,p} = C_{r,meas} - C_{r,TS} - C_{r,T}$$

By determining various dependencies between the individual components of the capacities $C_{m,meas}$, $C_{r,meas}$ measured, and intelligent combination of those dependencies, it is possible to determine and output the pressure-induced component $C_{m,p}$ of the measuring capacitance.

The dependencies between the individual components of the measured capacities $C_{m,meas}$, $C_{r,meas}$ determined by measurements are shown below.

Figure 2:
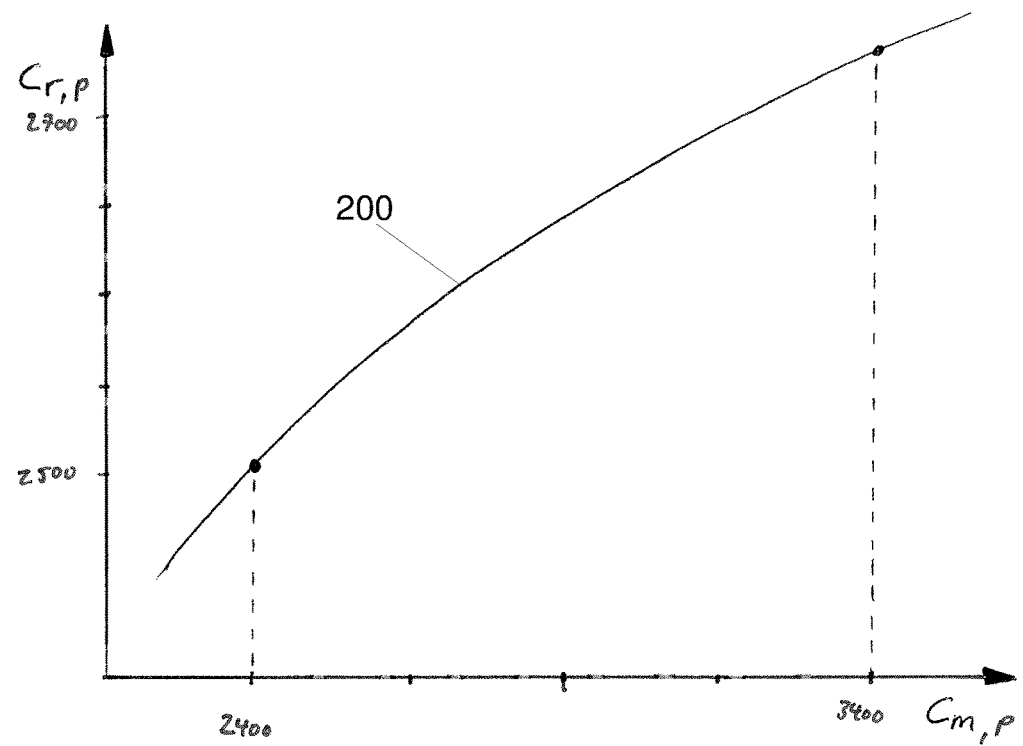
FIG. 2 is a graph showing the dependence of the pressure-induced change in capacitance of the reference capacitance from the pressure-induced change of the measuring capacitance.

Measurements have shown that the pressure-induced components $C_{m,p}$, $C_{r,p}$ change in specific dependence $C_{r,p}$ ($C_{m,p}$) on each other. This dependence is shown in FIG. 2. The characteristic curve 200 shows the dependence of the pressure-induced component $C_{r,p}$ of the reference capacitance on the pressure-induced component $C_{m,p}$ of the measuring capacitance.

It has been shown that $C_{r,p}$ ($C_{m,p}$) describes a quadratic relationship. In order to determine this correlation for a pressure measuring cell 100, it is sufficient to determine the correlation for at least three different pressures p when calibrating the pressure measuring cell 100. Based on these three measuring points, a first interpolation can be performed. Based on three different measured values, a polynomial interpolation is possible for a second-degree polynomial which describes the above-mentioned quadratic relationship. The polynomial available in this way can be represented as follows:

$$C_{r,p} = \sum_{i=0}^{2} a_i C_{m,p}^i$$

The polynomial coefficients $a_i$ from the above equation are determined by the measurements and subsequent interpolation and are therefore known.

Figure 3:
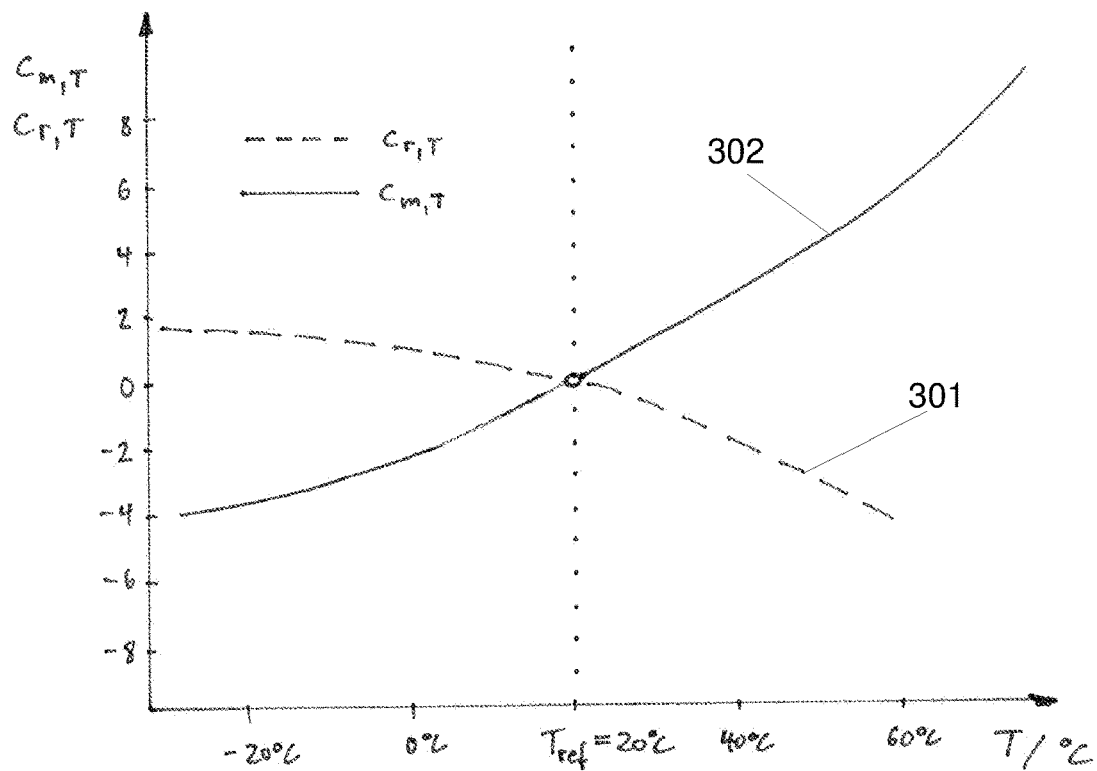
FIG. 3 is a graph showing the dependence of the reference capacitance and the measuring capacitance on the system temperature.

It has also been shown that the temperature-induced portions $C_{m,T}$, $C_{r,T}$ of the measured capacities $C_{m,meas}$, $C_{r,meas}$ also follow a certain dependence, which is shown in FIG. 3. Characteristic curve 301 shows the dependence of the temperature-induced portion of the reference capacitance $C_{r,T}$ on the system temperature T referenced to a reference temperature $T_{ref}$. Characteristic curve 302 shows the dependence of the temperature-induced portion of the measuring capacitance $C_{m,T}$ on the system temperature T referenced to the reference temperature $T_{ref}$. The relative change of the respective capacitance $C_{m,T}$, $C_{r,T}$ related to the capacitance at the reference temperature $T_{ref}$ is shown.

From FIG. 3 it may be seen that both the change in the temperature-induced portion of the measurement capacitance $C_{m,T}$ (characteristic 302) and the temperature-induced portion of the reference capacitance $C_{r,T}$ (characteristic 301) are in quadratic dependence on the respective capacitance at the reference temperature $T_{ref}$. FIG. 3 shows an example of the dependence of the temperature induction of the measuring capacitance $C_{m,T}$ and the temperature-induced portion of the reference capacitance $C_{r,T}$ for the thermal equilibrium, i.e. if the pressure measuring cell has the measured system temperature T without a temperature gradient within the pressure measuring cell 100, related to the respective capacitance at a reference temperature of 20° C. The temperature gradient of the pressure measuring cell 100 is shown as a reference temperature.

The corresponding values are cell-specific and must be determined for each measuring cell. By determining the temperature-induced components $C_{m,T}$, $C_{r,T}$ for at least three points, this quadratic relationship can also be determined by polynomial interpolation. The temperature-induced portions $C_{m,T}$, $C_{r,T}$ can thus be represented as follows:

$$C_{m,T} = \sum_{k=0}^{2} \xi_k (T - T_{ref})^k$$

$$C_{r,T} = \sum_{k=0}^{2} \eta_k (T - T_{ref})^k$$

A temperature of 20° C. is selected as the reference temperature $T_{ref}$ in the present relation. At that reference temperature, a temperature-induced component $C_{m,T}$, $C_{r,T}$ is assumed to be 0.

The coefficients $\xi_k$ and $\eta_k$ are known by measurement and interpolation.

It should be noted that in the present exemplary embodiment it is assumed that a temperature increase results in concave bending of the membrane 102, i.e. reduction of the distance between the membrane electrode 108 and the measuring electrode 106, and thus increase in measuring capacitance $C_{m,meas}$. Due to the circumferential attachment of the membrane 102 by means of the joint 103 to the base 104, concave bending of the membrane 102 in the center of the membrane results in counter bending in the edge area and thus increase in distance between the membrane electrode 108 and the reference electrode 107, which results in reduction in reference capacitance $C_{r,meas}$.

Depending on the design and dimensioning of the pressure measuring cell 100, the opposite effect may also occur, but this is then automatically incorporated into the dependence relation shown above, based on the measurements and the interpolation based thereon.

Figure 4:
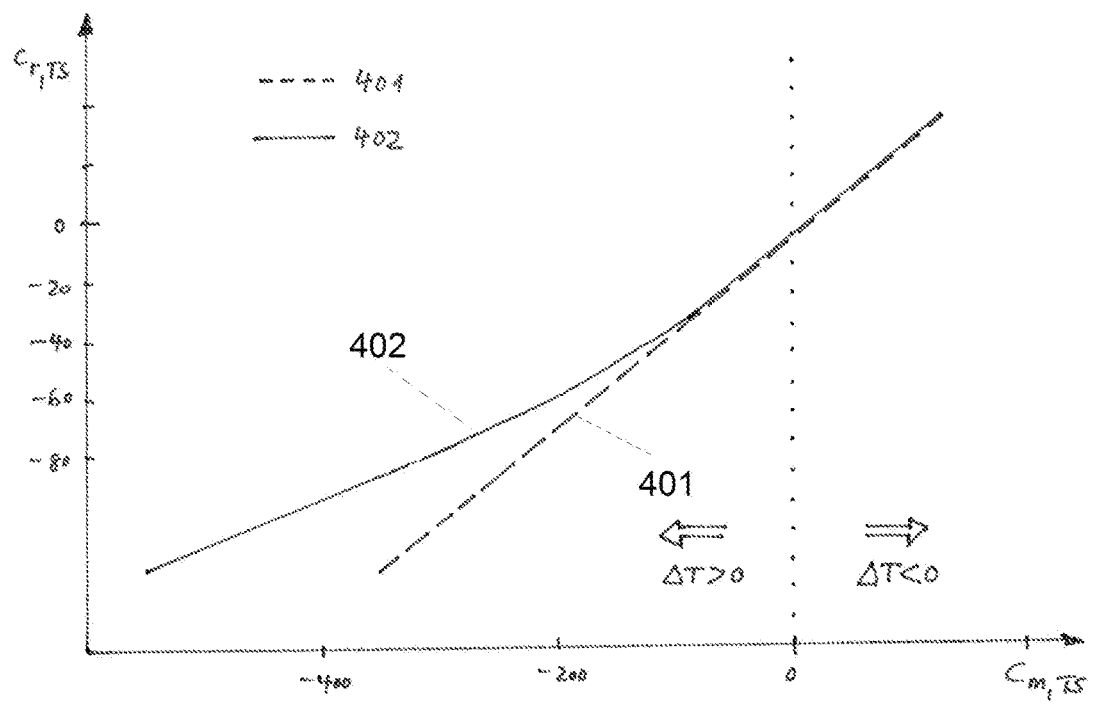
FIG. 4 is a graph showing the dependence of thermal shock-induced change in capacitance of the reference capacitance on the thermal shock-induced change of the measuring capacitance and FIG. 5 is a graph showing a comparison of the output values of a measuring cell according to FIG. 1 without and with the application of the procedure of the present application.

Surprisingly, it has been shown that the measuring capacitance $C_{m,meas}$ and the reference capacitance $C_{r,meas}$ also change in the case of a thermal shock TS, i.e. a rapid temperature change $\Delta T$ acting on the membrane 102, in a determinable dependence $C_{r,TS}(C_{m,TS})$ on each other. FIG. 4 shows this dependence of the thermal shock induced portion of $C_{r,TS}$ of the reference capacitance on the thermal shock induced portion $C_{m,TS}$ of the measuring capacitance for different pressure measuring cells 100.

In the simplest case, there is a linear relationship (curve 401) for both hot and cold thermal shocks ($\Delta T > 0$ or $\Delta T < 0$). A linear correlation was found in pressure measuring cells 100 having a measuring range for pressures p greater than 1 bar.

Such pressure measuring cells comprise a membrane 102 with a thickness from approx. 0.25 mm, wherein thicker membranes are used for higher pressures.

For pressure measuring cells 100 having a measuring range for low pressures p in the range of some tens of a bar, which have a membrane having a thickness of about 1/10 mm, the linear description is not sufficient to describe the facts with sufficient accuracy and a cubic compensation function 402 must be made use of.

Alternatively, it is also possible to design pressure measuring cells 100, which require two different functions for cold and hot thermal shocks.

Depending on the measured values received, the correct variant for displaying the dependence can be selected. A cubic dependence $C_{r,T}S(C_{m,TS})$ of the thermal shock induced components, as shown in curve 402, can be represented as follows:

$$C_{r,TS} = \sum_{j=0}^{3} b_j C_{m,TS}^j$$

In summary, two systems of equations with only two unknowns $C_{m,p}$ and $C_{m,TS}$ will be received.

$$C_{m,p} = C_{m,meas} - C_{m,TS} - \sum_{k=0}^{2} \xi_k (T - T_{ref})^k$$

$$\sum_{i=0}^{2} a_i C_{m,p}^i = C_{r,meas} - \sum_{j=0}^{3} b_j C_{m,TS}^j - \sum_{k=0}^{2} \eta_k (T - T_{ref})^k$$

By combining the two equations, they may be reduced to one equation:

$$\sum_{i=0}^{2} a_i \left( C_{m,meas} - C_{m,TS} - \sum_{k=0}^{2} \xi_k (T - T_{ref})^k \right)^i =$$

$$C_{r,meas} - \sum_{j=0}^{3} b_j C_{m,TS}^j - \sum_{k=0}^{2} \eta_k (T - T_{ref})^k$$

By writing out the above mentioned polynomials and combining the coefficients into a new coefficient a the equation may be represented as follows and the desired correction parameters may be determined by determining the zeros of the polynomial $$\sum_{l=0}^{3} \varepsilon_l C_{m,TS}^l = 0$$

The coefficients $\varepsilon_i$ are calculated as follows:

$$\varepsilon_3 = b_3$$

$$\varepsilon_2 = b_2 + a_2$$

$$\varepsilon_1 = b_1 - a_1 - 2a_2 \left( C_{m,meas} - \sum_{k=0}^{2} \xi_k (T - T_{ref})^k \right)$$

$$\varepsilon_0 = b_0 - \left( C_{r,meas} - \sum_{k=0}^{2} \eta_k (T - T_{ref})^k \right) + \sum_{i=0}^{2} a_i \left( C_{m,meas} - \sum_{k=0}^{2} \xi_k (T - T_{ref})^k \right)^i$$

As all coefficients of $a_i$, $b_i$, $\xi_k$ and $\eta_k$ are known from the measurements and the system temperature T and also the measured measuring capacity $C_{m,meas}$ are determined during the measurement, all coefficients $\varepsilon_i$ can be determined. Thus, determination of $C_{m,TS}$ from the quadratic equation system can be carried out, for example, by an iterative procedure, e.g. the Newton procedure for determining the zeros, or by an analytical procedure, e.g. by the Cardan's formulae.

Due to the known dependencies, which are known from the measurements and the interpolations based thereon, all other values will result.

Figure 5:
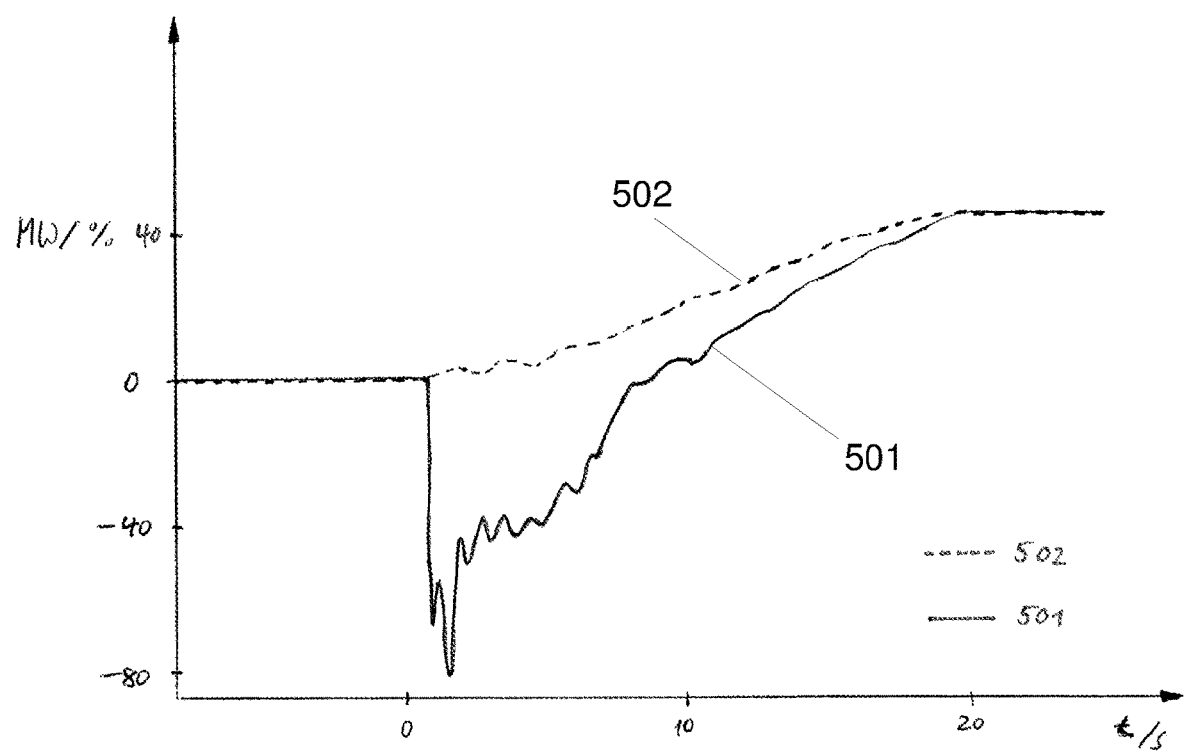

FIG. 5 shows an example of the measured value curve of a ceramic 0.1 bar relative pressure measuring cell 100, as shown in FIG. 1, with and without application of the method described herein during a thermal shock. The measured value MW is shown as a function of time t, wherein at the time t=0 s a thermal shock of approx. 100° C./s with simultaneous pressure increase to 50% of the maximum pressure of the measuring cell (approx. 50 cm water column) acts on the pressure measuring cell 100.

The relative measured value MW is shown in relation to the pressure p applied before thermal shock TS.

Curve 501 is directly derived from the measured values $C_{m,meas}$ and $C_{r,meas}$ without consideration of the proposed thermal shock compensation. Curve 502 shows the measured value course with the suggested thermal shock compensation by determining the values of $C_{m,TS}$, $C_{r,TS}$, $C_{m,T}$ and $C_{r,T}$.

From FIG. 5 it is clear that the method of the present application can almost completely compensate for a thermal shock, whereas without the method provided a measured value will only approach the actual pressure p after about 30 seconds have elapsed, thus not providing any useful measurement results for that period.

For determination of the correction parameters polynomials of maximum 3rd order are sufficient. For possibly more complex relationships between the parameters, however, higher-order polynomials are also conceivable. The advantage of the description by using polynomials resides in that the relationship described may analytically be solved completely.

LIST OF COMPONENTS

100 Pressure measuring cell
102 Membrane
103 Joint
104 Base body
105 Temperature sensor
106 Measuring electrode
107 Reference electrode
108 Membrane electrode
109 Microcontroller
110 Measurement electronic
111 Memory
200 Characteristic curve $C_{r,p}$ ($C_{m,p}$)
301 Characteristic curve $C_{r,T}$ (T)
302 Characteristic curve $C_{m,T}$ (T)
401 Characteristic curve $C_{r,TS}$ (Cm,TS) for thick membranes
402 Characteristic $C_{r,TS}$ (Cm,TS) for thin membranes
501 Output value without compensation
502 Output value with compensation
$C_{m,meas}$ capacitance value of the measuring capacitance as measured
$C_{m,p}$ pressure-induced portion of measuring capacity
$C_{m,T}$ temperature-induced portion of the measuring capacity
$C_{m,TS}$ thermal shock-induced portion of measuring capacity
$C_{r,meas}$ capacitance value of reference capacitance, as measured
$C_{r,p}$ pressure-induced proportion of reference capacity
$C_{r,T}$ temperature-induced proportion of reference capacity
$C_{r,TS}$ thermal shock-induced portion of reference capacitance
MW measured value
p pressure
t time
T system temperature
$T_{ref}$ reference temperature
TS thermal shock
$\Delta T$ temperature difference, magnitude of thermal shock

We claim:

1. A method for compensating measured values in a capacitive pressure measuring cell comprising a membrane electrode being arranged on a membrane, a measuring electrode and a reference electrode surrounding the measuring electrode being arranged opposite to the membrane electrode on a base body, such method using a measuring capacitance, at least one reference capacitance, a measurement electronic comprising a microcontroller and a memory, with
 a pressure-induced capacitance change of the at least one reference capacitance as a function of a pressure-induced capacitance change of the measuring capacitance, and
 a thermal shock-induced capacitance change of the at least one reference capacitance as a function of a thermal shock-induced capacitance change of the measuring capacitance, being stored in the memory,
wherein an algorithm stored on the memory, when executed, instructs the microcontroller to implement the following steps:
 determining a pressure-induced capacitance change of the at least one reference capacitance as a function of a pressure-induced capacitance change of the measuring capacitance, determining a thermal shock-induced capacitance change of the at least one reference capacitance as a function of a thermal shock-induced capacitance change of the measuring capacitance, measuring the measuring capacitance and the at least one reference capacitance, determining the thermal shock-induced capacitance change of the measuring capacitance from a combination of the capacitance changes previously determined, compensating the measured measuring capacitance using the thermal shock-induced capacitance change of the measuring capacitance, determining and outputting a pressure-induced capacitance change or a quantity derived therefrom, determining a static temperature-induced capacitance change of the measuring capacitance as a function of a reference temperature and a system temperature, determining a static temperature-induced capacitance change of the at least one reference capacitance as a function of a reference temperature and the system temperature, measuring the system temperature, determining temperature-induced change of measuring capacitance, compensating for the measuring capacitance by the thermal shock induced capacitance change of a measuring capacitance and the temperature-induced change of the measuring capacitance, and determining and outputting of the pressure-induced capacitance change of the measuring capacitance or a quantity derived therefrom.

2. A method for compensating measured values in a capacitive pressure measuring cell comprising a membrane electrode being arranged on a membrane, a measuring electrode and a reference electrode surrounding the measuring electrode being arranged opposite to the membrane electrode on a base body, such method using a measuring capacitance, at least one reference capacitance a microcontroller and a computer readable medium comprising an algorithm that, when executed, instructs the microcontroller to implement the method, comprising the following steps:

determining a pressure-induced capacitance change of the at least one reference capacitance as a function of a pressure-induced capacitance change of the measuring capacitance, determining a thermal shock-induced capacitance change of the at least one reference capacitance as a function of a thermal shock-induced capacitance change of the measuring capacitance, measuring the measuring capacitance and the at least one reference capacitance, determining the thermal shock-induced capacitance change of the measuring capacitance from a combination of the capacitance changes previously determined, compensating the measured measuring capacitance using the thermal shock-induced capacitance change of the measuring capacitance, determining and outputting a pressure-induced capacitance change or a quantity derived therefrom determining a static temperature-induced capacitance change of the measuring capacitance as a function of a reference temperature and a system temperature, determining a static temperature-induced capacitance change of the at least one reference capacitance as a function of a reference temperature and the system temperature, measuring the system temperature, determining temperature-induced change of measuring capacitance, compensating for the measuring capacitance by the thermal shock induced capacitance change of a measuring capacitance and the temperature-induced change of the measuring capacitance, and determining and outputting of the pressure-induced capacitance change of the measuring capacitance or a quantity derived therefrom.

3. A fill level measurement arrangement for a pressure measuring cell comprising a membrane being attached to a base body via a circumferential joint, a membrane electrode being arranged on the membrane, a measuring electrode and a reference electrode surrounding the measuring electrode being arranged opposite to the membrane electrode on the base body, the membrane electrode and the measuring electrode forming a measuring capacitance and the membrane electrode and the reference electrode forming a reference electrode, a measuring electronic coupled to the pressure measuring cell and comprising a microcontroller implementing a method for compensating measured values in capacitive pressure measuring cells using a measuring capacitance and at least one reference capacitance, comprising the following steps:

determining a pressure-induced capacitance change of the at least one reference capacitance as a function of a pressure-induced capacitance change of the measuring capacitance, determining a thermal shock-induced capacitance change of the at least one reference capacitance as a function of a thermal shock-induced capacitance change of the measuring capacitance, measuring the measuring capacitance and the at least one reference capacitance, determining the thermal shock-induced capacitance change of the measuring capacitance from a combination of the capacitance changes previously determined, compensating the measured measuring capacitance using the thermal shock-induced capacitance change of the measuring capacitance, determining and outputting a pressure-induced capacitance change or a quantity derived therefrom determining a static temperature-induced capacitance change of the measuring capacitance as a function of a reference temperature and a system temperature, determining a static temperature-induced capacitance change of the at least one reference capacitance as a function of a reference temperature and the system temperature, measuring the system temperature, determining temperature-induced change of measuring capacitance, compensating for the measuring capacitance by the thermal shock induced capacitance change of a measuring capacitance and the temperature-induced change of the measuring capacitance, and determining and outputting of the pressure-induced capacitance change of the measuring capacitance or a quantity derived therefrom.

4. A compensation device for compensating measured values of a capacitive pressure measuring cell comprising a membrane electrode being arranged on a membrane, a measuring electrode and a reference electrode surrounding the measuring electrode being arranged opposite to the membrane electrode on a base body and using a measuring capacitance, at least one reference capacitance and a memory,
- a pressure-induced capacitance change of the at least one reference capacitance as a function of a pressure-induced capacitance change of the measuring capacitance, and
- a thermal shock-induced capacitance change of the at least one reference capacitance as a function of a thermal shock-induced capacitance change of the measuring capacitance, being stored in the memory, the compensation device further comprising microcontroller coupled to the capacitive measuring cell and the memory the microcontroller implementing the following steps:
- determining a pressure-induced capacitance change of the at least one reference capacitance as a function of a pressure-induced capacitance change of the measuring capacitance,
- determining a thermal shock-induced capacitance change of the at least one reference capacitance as a function of a thermal shock-induced capacitance change of the measuring capacitance,
- measuring the measuring capacitance and the at least one reference capacitance,
- determining the thermal shock-induced capacitance change of the measuring capacitance from a combination of the capacitance changes previously determined,
- compensating the measured measuring capacitance using the thermal shock-induced capacitance change of the measuring capacitance,
- determining and outputting a pressure-induced capacitance change or a quantity derived therefrom
- determining a static temperature-induced capacitance change of the measuring capacitance as a function of a reference temperature and a system temperature,
- determining a static temperature-induced capacitance change of the at least one reference capacitance as a function of a reference temperature and the system temperature,
- measuring the system temperature,
- determining temperature-induced change of measuring capacitance,
- compensating for the measuring capacitance by the thermal shock induced capacitance change of a measuring capacitance and the temperature-induced change of the measuring capacitance, and
- determining and outputting of the pressure-induced capacitance change of the measuring capacitance or a quantity derived therefrom.

\* \* \* \* \*